United States Patent [19]
Almeida

[11] Patent Number: 5,771,941
[45] Date of Patent: Jun. 30, 1998

[54] LONGITUDINAL OPEN TUBULAR CLAMPS FOR FIXING INSULATION ON PIPING

[76] Inventor: Maria Eliane Almeida, Rua Candido Juca, 100 - Apto. 403, Fortaleza, CE, Brazil

[21] Appl. No.: 534,137

[22] Filed: Sep. 26, 1995

Related U.S. Application Data

[63] Continuation of Ser. No. 184,608, Jan. 21, 1994, abandoned.

[30] Foreign Application Priority Data

Jan. 25, 1993 [BR] Brazil .................................. PI9300271

[51] Int. Cl.$^6$ ........................................................ F16L 9/14
[52] U.S. Cl. ...................... 138/149; 138/156; 138/110; 138/167
[58] Field of Search ................................. 138/110, 149, 138/156, 155, 108, 167

[56] References Cited

U.S. PATENT DOCUMENTS

| | | | |
|---|---|---|---|
| 276,044 | 4/1883 | Holt | 138/149 |
| 411,115 | 9/1889 | Wendell | 138/149 |
| 913,376 | 2/1909 | Gherky | 138/149 |
| 1,002,932 | 9/1911 | Richards | 138/149 |
| 1,481,149 | 1/1924 | Quinn | 138/142 |
| 1,668,635 | 5/1928 | De Stefani | 138/149 |
| 2,545,030 | 3/1951 | Isenberg et al. | 138/149 |
| 4,175,593 | 11/1979 | Sack | 138/110 |
| 4,603,806 | 8/1986 | Watanabe et al. | 138/171 |
| 4,605,043 | 8/1986 | Grenier | 138/149 |
| 4,772,507 | 9/1988 | Leo, Jr. et al. | 138/149 X |
| 4,780,347 | 10/1988 | Cohen | 138/149 X |
| 4,857,371 | 8/1989 | McClintock | 138/149 X |
| 4,996,088 | 2/1991 | Knittel et al. | 138/149 X |
| 5,123,453 | 6/1992 | Robbins | 138/149 |
| 5,400,602 | 3/1995 | Chang et al. | 138/149 X |

*Primary Examiner*—Patrick F. Brinson
*Attorney, Agent, or Firm*—Morgan & Finnegan, LLP

[57] ABSTRACT

A tubular longitudinal clamp is used to fix thermal insulation along piping within the clamp. The clamp comprises an open tubular body having one end with a larger diameter than the other end so that the tubular clamps can be fitted together by insertion of the smaller diameter end of one clamp into the larger diameter end of a second clamp. An embodiment of the invention includes a thermal insulation system for high or low temperature piping. Insulating material in parts of several lengths or helicoidal application with a width identical to the perimeter of an industrial pipe is installed on the pipe and is clamped thereto with a series of open tubular clamps mated one to the other.

14 Claims, 13 Drawing Sheets

LONGITUDINAL OPEN TUBULAR CLAMPS FOR FIXING INSULATION ON PIPING

This is a continuation of application Ser. No. 08/184,608, filed on Jan. 21, 1994 now abandoned.

SUMMARY OF THE INVENTION

The present invention relates to a device the object of which is to fix several types of flexible and semiflexible thermal insulations in the pipings, also providing protection against the weather actions and resistance against mechanical abuses, reaching a greater efficiency, productivity and, as a result, a total cost well below that covering devices presently used.

A further object of the present invention relates to the thermal insulation system for high and low temperature piping, used by industries in general made up of insulation material on the basis of ceramic fiber and said device for fixing thermal insulations in the pipings.

At the present time, the thermal insulation system adopt for its fixation to the pipe to be insulated, metallic bands and plastic material bending tape, aluminum or steel with seals which secure the aluminum-protection plate or of prepainted steel. These fixing devices require specific tools for their installation and a trained personal, involving considerable costs for the assembly of the thermal insulation.

Further, the present thermal insulating system used rigid, semirigid and flexible insulators, such as calcium silicate, rock wool, expanded polyurethane, glass fiber, etc, and are protected by aluminum sheet, prepainted plate, rolled metallics or not, bending tapes, seals, etc.

It is desirable, therefore, that a device for fixing the thermal insulation be provided for the purpose of eliminating the use of metallic bands, or bending tapes of plastic material, aluminum or steel with seals, etc, as well as of a system which eliminates the use of rigid, semirigid and flexible insulators by using other protection elements.

These and other purposes are reached by providing a device for fixing thermal insulations in pipings comprising a longitudinal tubular clamp which permits an excellent fixation of the insulator upon the surface of the pipe, and also provides for impermeability and resistance to the impact. Said longitudinal tubular clamp being produced on the basis of polyvinylchloride (PVC), fiber glass reinforced polyethylene (PRFV), polyester, polypropylene, polyethylene or any other polymer and metallics, and comprising an open tubular body showing a normal end and other end of larger diameter.

There is further provided a thermal insulating system comprising the applications in the high or low temperature pipings used by the industries in general, of insulating material on the basis of ceramic fiber..(silica and alumina or silicate of calcium magnesium), followed by an outer protection comprising a tubular longitudinal clamp.

The objects, features and advantages of the present invention, will now become more apparent from the following detailed description taken in conjunction with the drawing accompanying the present specification, wherein:

DETAILED DESCRIPTION OF THE INVENTION

In accordance with the present invention, there is provided a device for fixing thermal insulaions in pipings, comprising a tubular longitudinal clamp 60, which permits an excellent fixation of the insulator upon the surface of the pipe, further providing impermeability and resistance to the impact; said tubular longitudinal clamp 60 comprising and open tubular body 62 showing normal end 64 and other end of larger diameter 66, produced on the basis of PVC, PRFV, polyester, polypropylene, polyethylene or any polymer and metallics.

The tubular longitudinal clamp 60 has features, such as density of 1.20 to 2.00 kg/m$^3$ weight of 2.26 kg/linear meter, low coefficient of thermal expansion, good flexibility, resistance to mechanical abuses, resistance to corrosion, chemical resistance, being inert to mineral acids and bases and resistant to substances existing in the effluentes of industrial sewages, facility in the cleaning, excellent impermeability, uniform finishing, easy transportation, handling, section and assembly not requiring special labour and equipment and tools.

No special device is required for the installation of the tubular longitudinal clamp 60, such as wire or bands, in view of its tubular shape and plasticity, the several segments of the clamp being consecutively coupled by the normal ends 64 and ends of larger diameter 66, the longitudinal sections being out of phase in such a way as not to allow them to open easily, the curves to short radius and "T" shown in FIGS. 2A–2D, being protected, only changing the cut given in the clamp.

A further object of the present invention relates to a thermal insulation system for a high and low temperature piping, used by the industries in general, comprising the aplication in the pipings of insulating material on the basis of ceramic fiber, such as preferably silica and alumina, or calcium magnesium silicate, followed by an outer protection consisting of the tubular longitudinal clamp 60 previously described.

The thermal insulating material of the system of the present invention is the ceramic fiber manufactured from the electrofusion of the silica and alumina, and also from the magnesium calcium silicate, showing characteristics such as thermal conductivity at 313° C. of 0.056 Kcal.m/m$^2$,h.°C. limit of use identical to 950° C., melting point of 1760° C., resistance to the thermal shock, fully inorganic, not undergoing deterioration under the action of water or oil, density of 64, 96, 128 and 240 Kg/m2, not being harmfull to human health, being highly flexiblle, allowing application in parts of complex configurations or shapes.

The thermal insulation system may be applied under whatever weather conditions, such as rain and/or strong winds or conditions of atmospheric condensation, its application is to be avoided only when soaked or impregnated with oil or water, only because of a greater weight and difficulties of use. The temperature of the surface of the piping also does not matter, care should be taken only as to personal accidents during the application, such as burnings in view of the temperature in the line to be insulated. The application of the system need not specialized labour, or special equipment, also not being required a treatment time and its application is immediate.

For the use in unprotected places, in open field, the system of the present invention has a tubular longitudinal clamp 60, which allows an excellent fixation of the insulator 68 upon the surface of pipe 70, further providing impermeability and resistance to the impact, avoiding soaking of the fiber with rainy water and mechanic abuses.

The insulating blankets 69 shall be either helicoidally applied or in parts of several lenghts, with a width identical to the perimeter of the pipe to be insulated and provisionally secured with adhesive tapes. The tubular longitudinal clamp 60 shall be immediately installed on the insulating blanket 69, which shall provide its protection against the action of weather (rains) and fixation upon pipe 70.

The several segments of protection coveing formed by the clamps 60 shall be coupled by the normal ends, 64, 66, the longitudinal sections being out of phase, in such a way as not to allow their openings easily. The accessories of the piping shall be insulated, being wrapped with blanket strips of ceramic fiber, which shall be protected by a protection covering (clamps) prefabricated, in accordance with the connection geometry (curves, T, reductions and connections, as can be seen from the FIGS. 2A to 2E) not being required the fixation of opening for inspection.

Figures 1A, 1B:
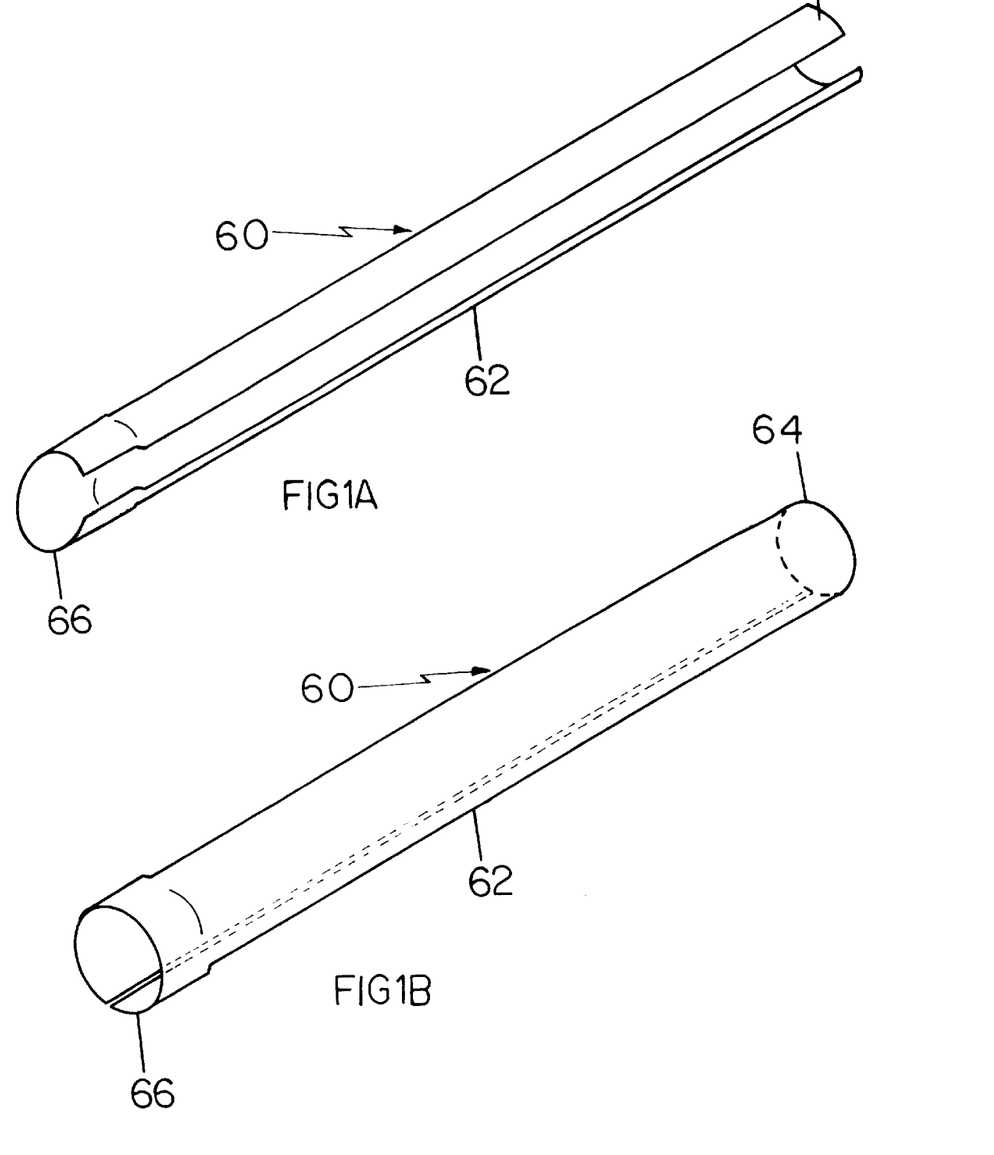
FIGS. 1A and 1B represent perspective views of the tubular longitudinal clamp with a section detail and a fixing detail, respectively.
Figure 2A:
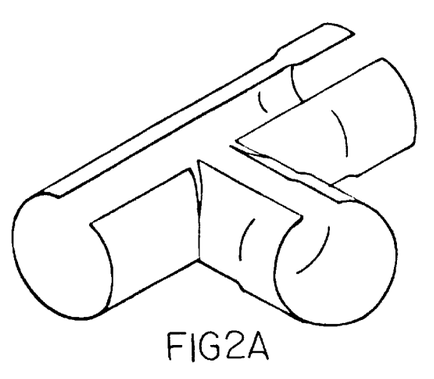
FIGS. 2A, 2B, 2C, 2D and 2E represent perspective views of a section detail and of the fixing of a "T" 90°. and detaills of the sections of a knee 90°., knee 45°. and reduction using segments of the tubular clamp, respectively.
Figure 2B:
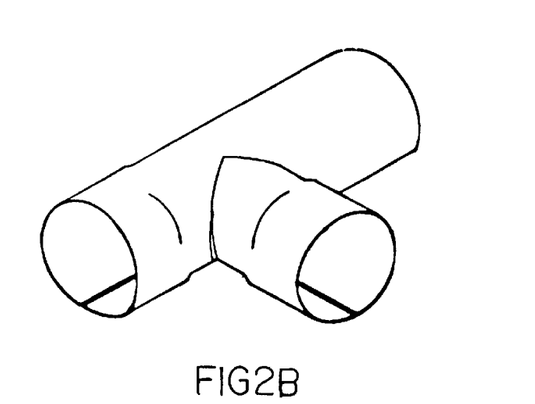
Figure 2C:
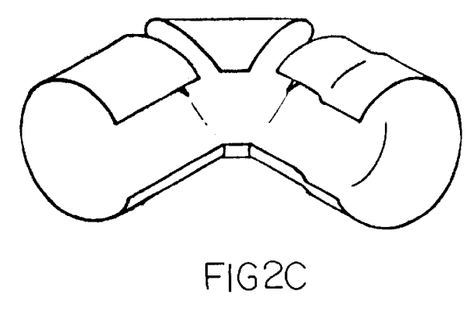
Figure 2D:
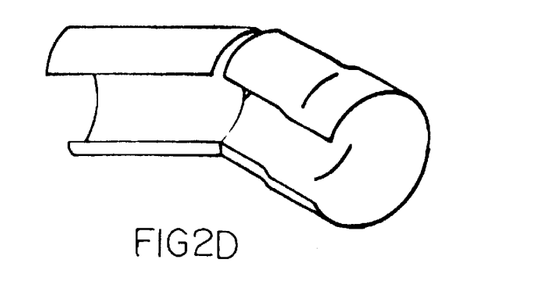
Figure 2E:
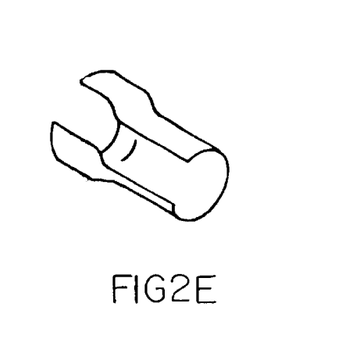
Figure 3:
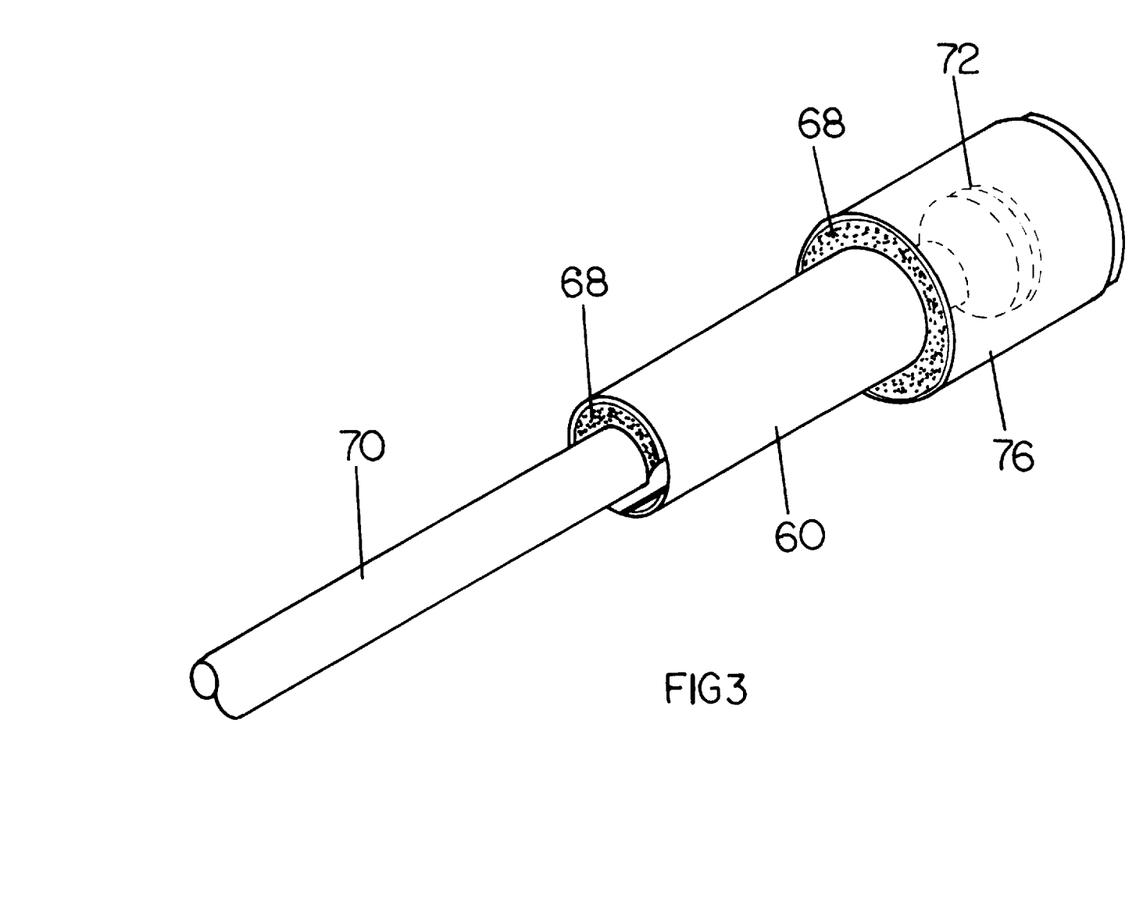
FIG. 3 is a perspectively view illustrating a coating system for an industrial piping.
Figure 4:
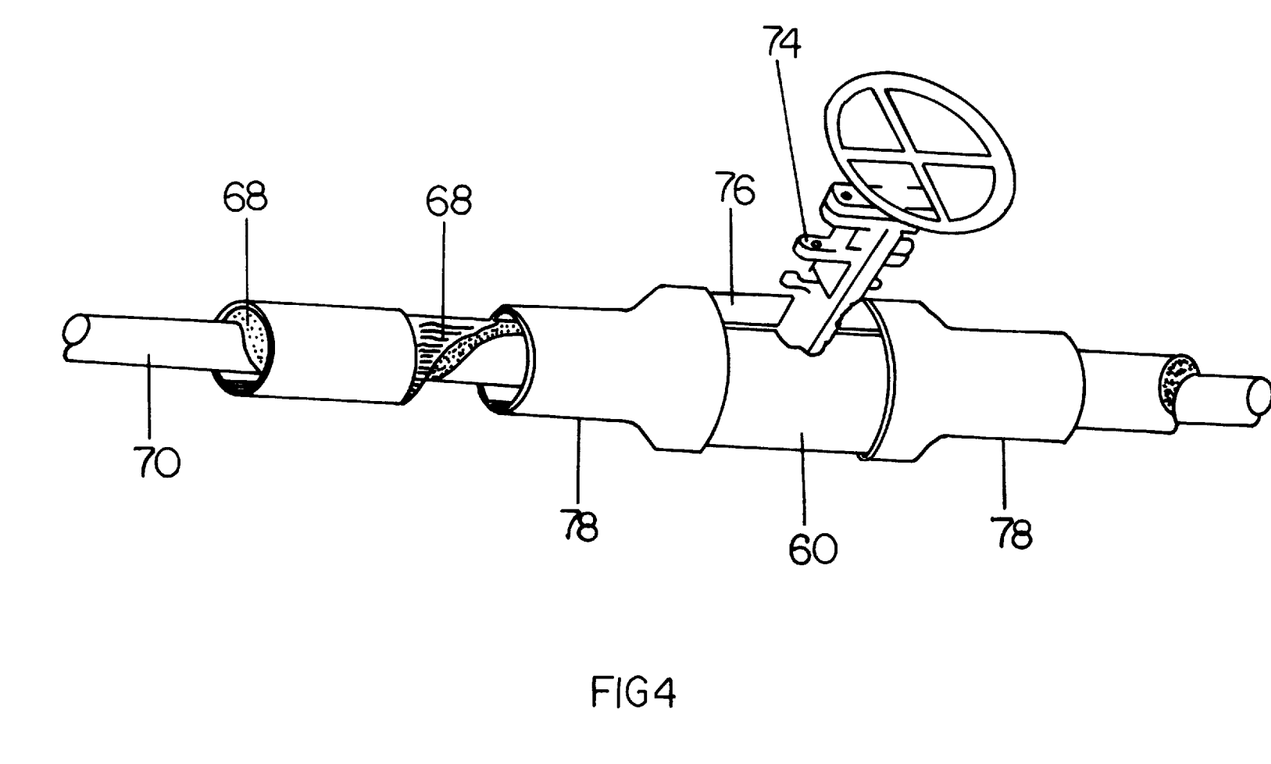
FIG. 4 is a perspectively view illustrating a coating system for an industrial piping with a valve.
Figure 5:
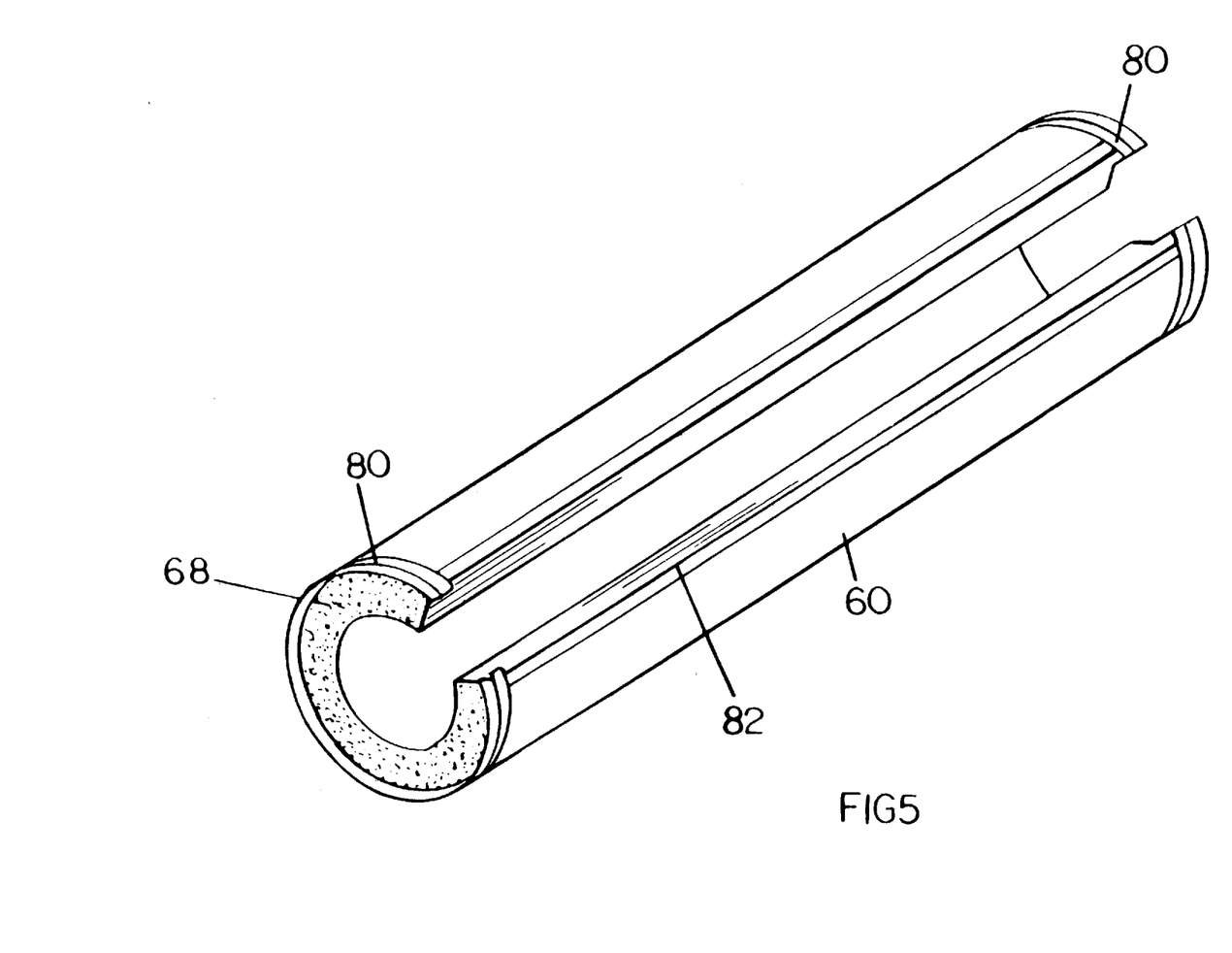
FIG. 5 is a perspective view of the tubular longitudinal clamp containing the insulating material of ceramic fiber and a fixing system through transversal and longitudinal zipper.
Figure 6:
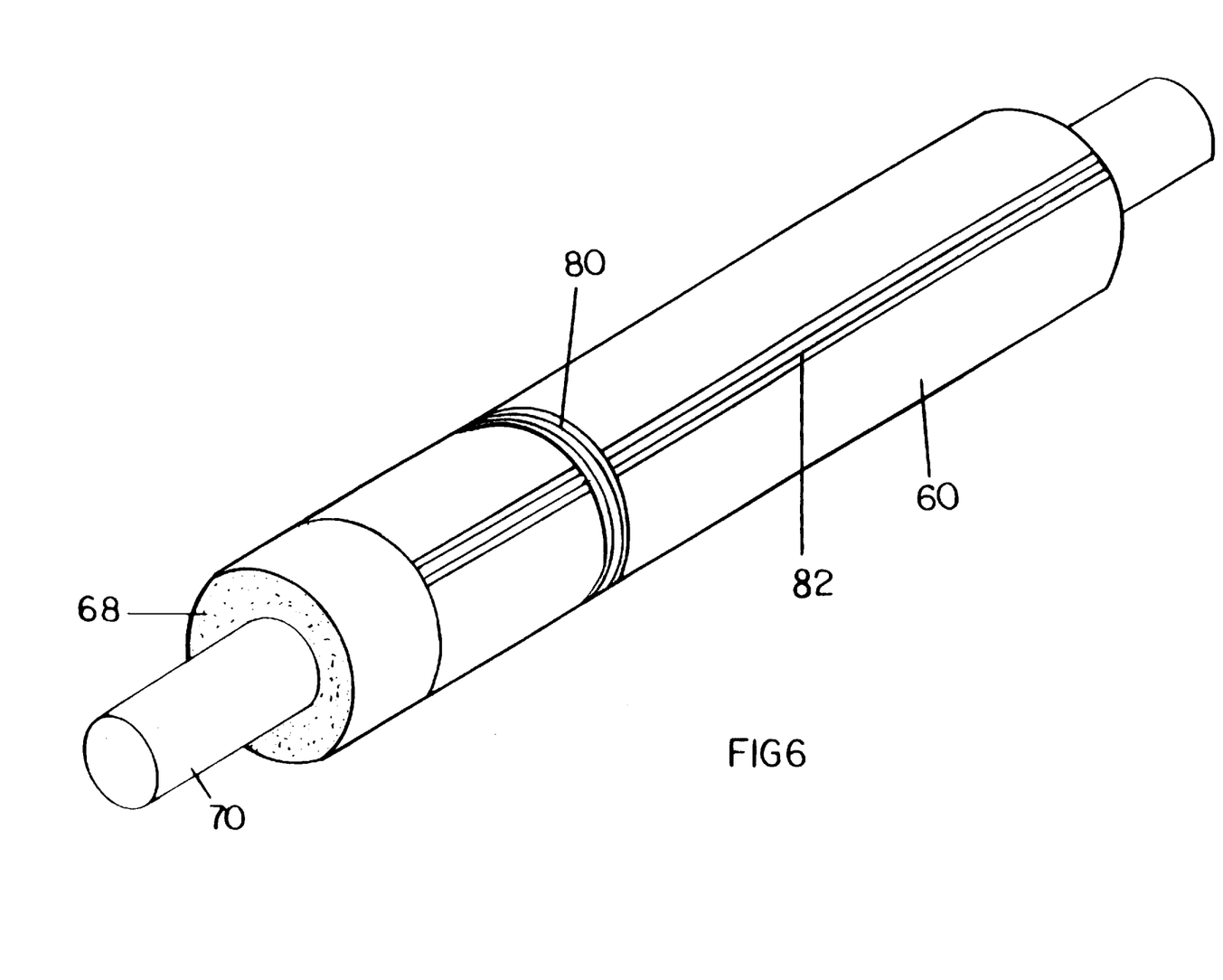
FIG. 6 is a perspective view of the tubular longitudinal clamp involving an industrial piping with the insulating material of ceramic fiber and fixing system through transversal and longitudinal zipper.
Figure 7:
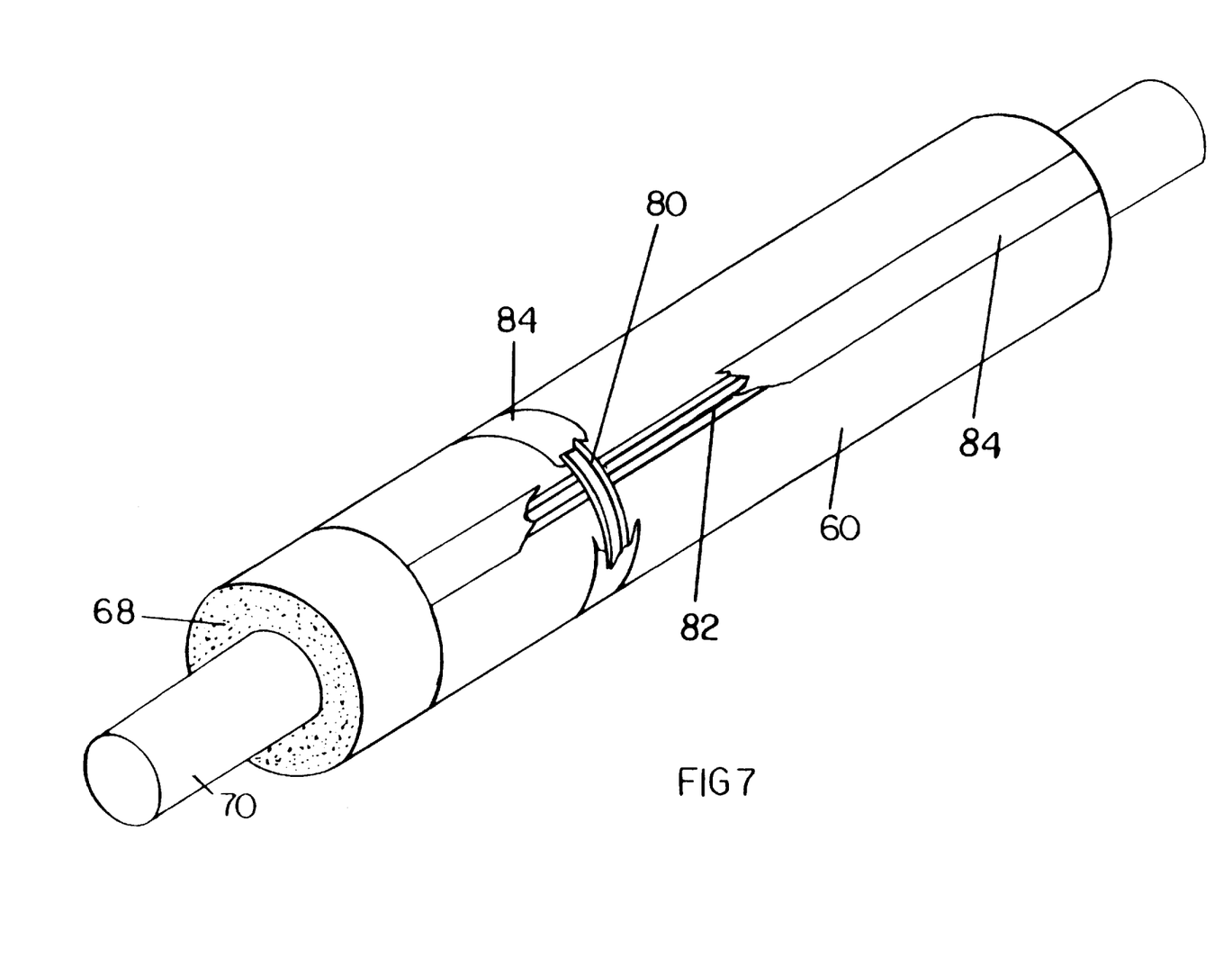
FIG. 7 is a perspective view of the tubular longitudinal clamp involving an industrial piping with the insulating material of ceramic fiber, fixing system through transversal and longitudinal zipper and self-adhesive tape.
Figure 8:
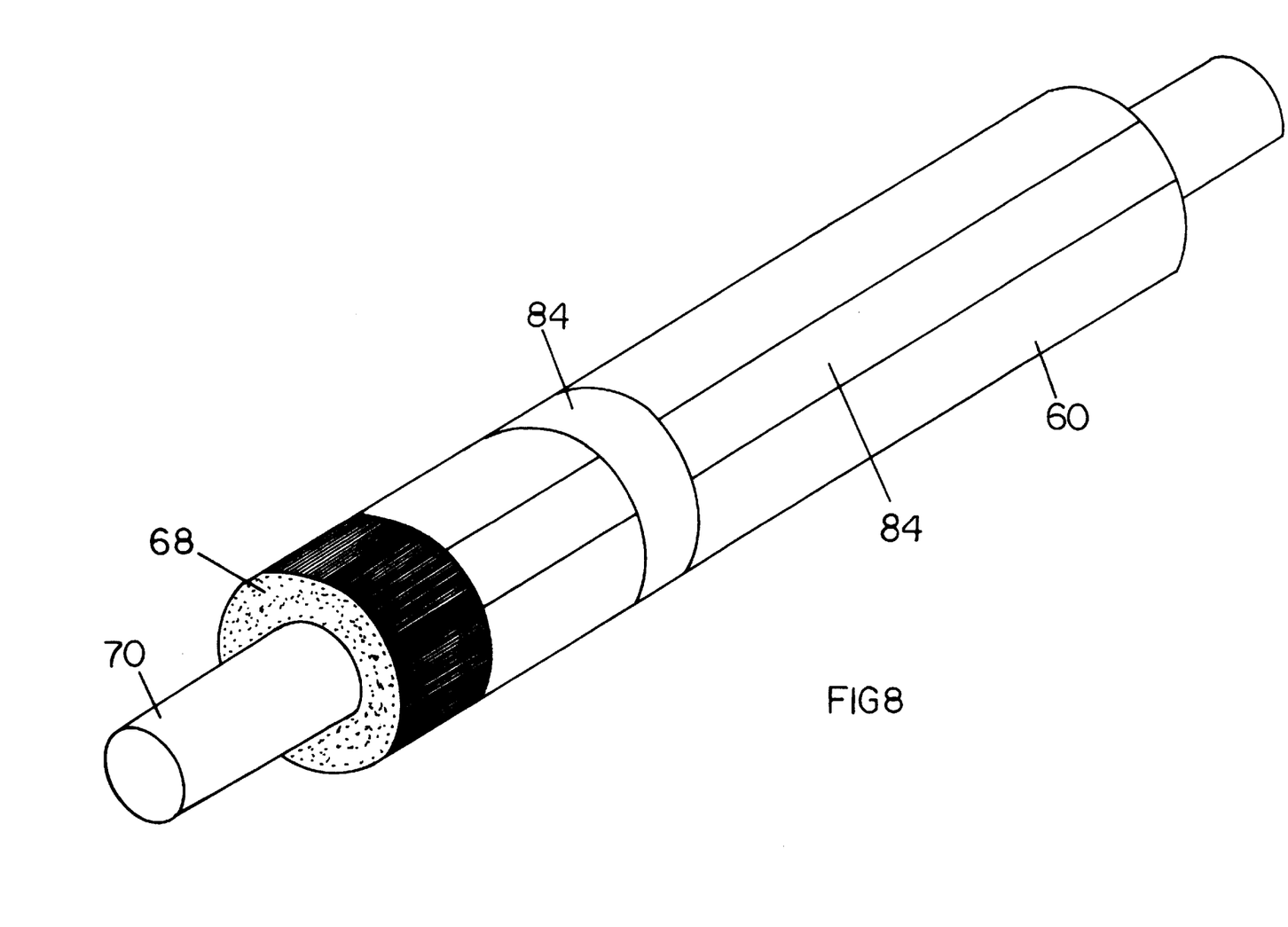
FIG. 8 is a perspective view of the tubular longitudinal clamp involving an industrial piping with the insulating material of ceramic fiber and the self-adhesive tape covering the transversal and longitudinal zipper.

The flanges 72 and valves 74 seen in greater details in FIGS. 3 and 4 shall receive a segment of the protection covering 76 of a greater diameter, with reductions 78 on each end (FIG. 4) in such a way as to preserve the thickness of the insulator 68 and keep its operativity. In portions where a greater resistance to impact is required, the protection covering 76 shall have a greater thickness, all the other features of the system being, however, maintained.

Upon the insulation of the buried pipings or crossings, proceed in the same way as described in the previous item, the following aspects shall, however, be observed: in the jacketed pipings, there shall be applied flakes of insulating material of the system in the annular space between the line of steam and inside surface in the jacketed pipe, not requiring tubular longitudinal clamp; in the case of pipings with no jacket, the same air specification shall be adopted, all the circumferential and longitudianl joints, however, shall be welded or fixed in such a way as to cause a total impermeability in the system for that portion.

The thermal insulating system for high and low temperature (about –200° C. to 1260° C.) piping comprises involving the industrial piping 70 to be insulated with the insulating material 68 such as ceramic fiber. The insulating material 68 is applied hellicoidally or in parts of several lenghts upon the surface of pipe 70, with width identical to the perimeter of the pipe to be insulated. Then, the tubular longitudinal clamp 60 is placed upon the surface of insulating material 68 involving the pipe 70 and insulating material 68.

The tubular longitudinal clamp 60 is provided in the transversal and longitudinal portions of zipper transversal and longitudinal 80, 82, 83 (FIG. 13) used in the closure operation of said tubular longitudinal clamp 60. Upon the transversal and longitudinal zipper 80, 82 are transversally and longitudinally applied self-adhesive tapes 84, being the assembly operation of the thermal insulating system showed in more details in the FIGS. 5 to 8.

Figure 9:
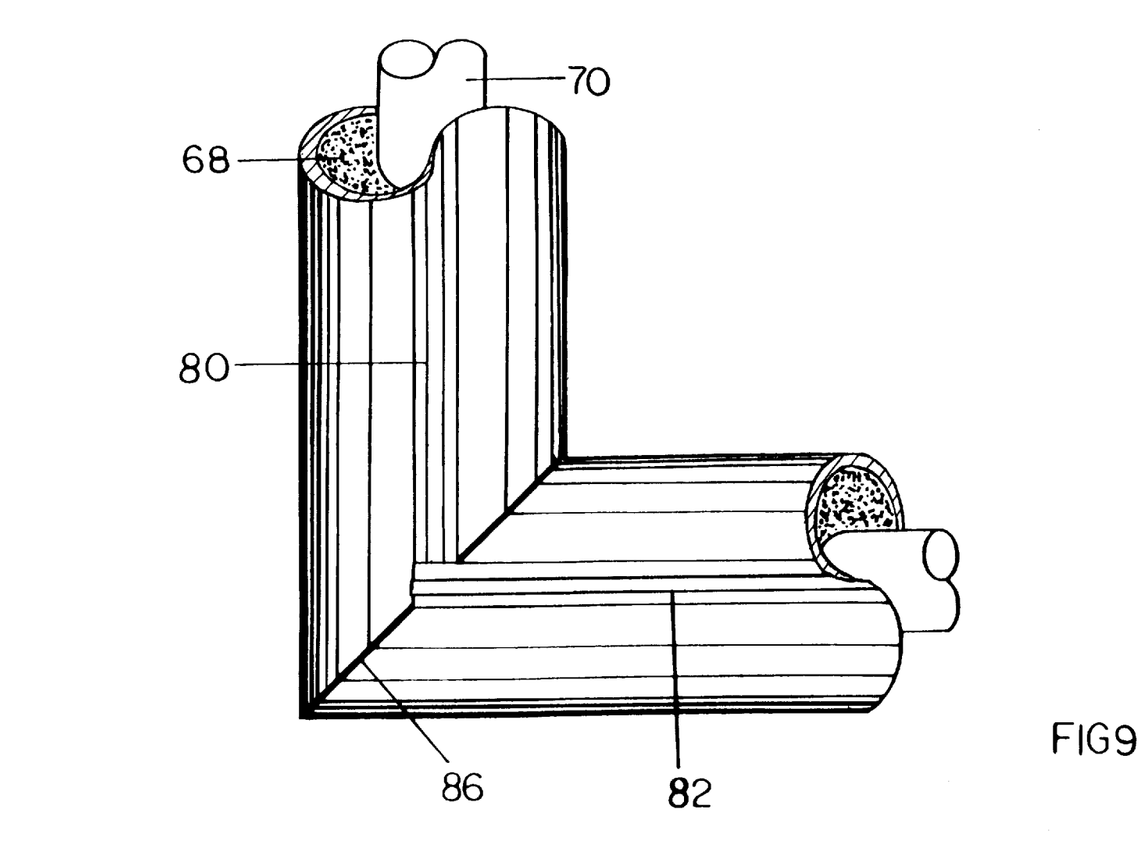
FIG. 9 is a perspective view of a segment of the tubular clamp representating a knee 90°. involving an industrial piping with the insulating material of ceramic fiber and fixing system through transversal and longitudinal zipper.
Figure 10:
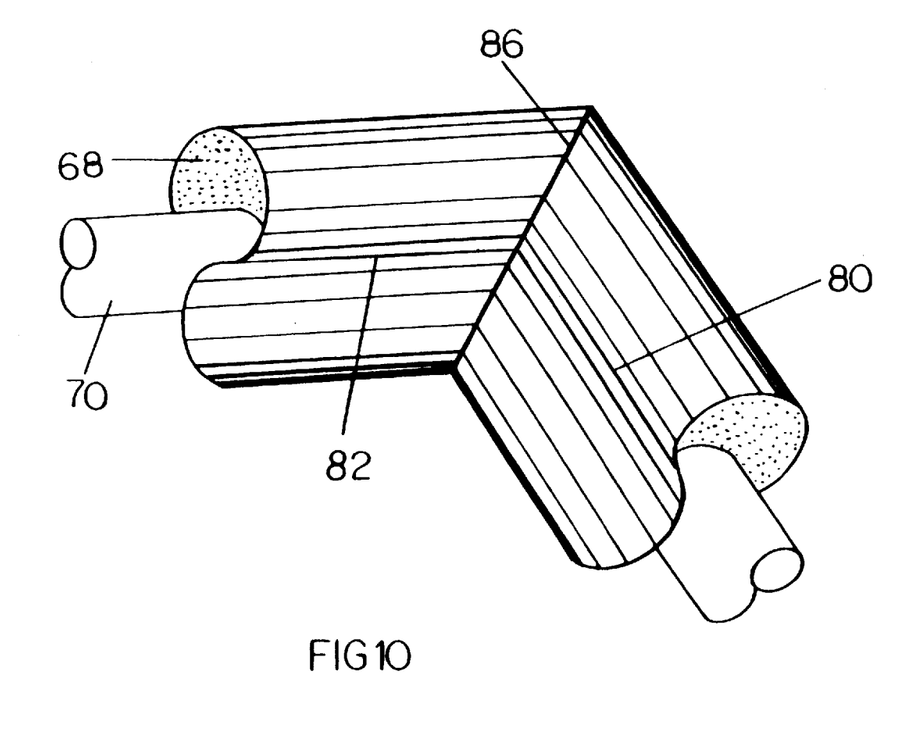
FIG. 10 is a perspective vie of a segment of the tubular clamp representating a knee 45°. involving an industrial piping with the insulating material of ceramic fiber and fixing system through zipper.

The FIGS. 9 and 10 shows segments of the tubular longitudinal clamp 60 used in knee 90°. and knee 45°. respectively. It should be noted that in the intersection of the transversal and longitudinal portions of the knee 90°. and 45°. it is provided in an inclined position a weld 86 produced by thermofusion or gluing, the glue used being preferably the ethylcyaneacrylate glue.

Figure 11:
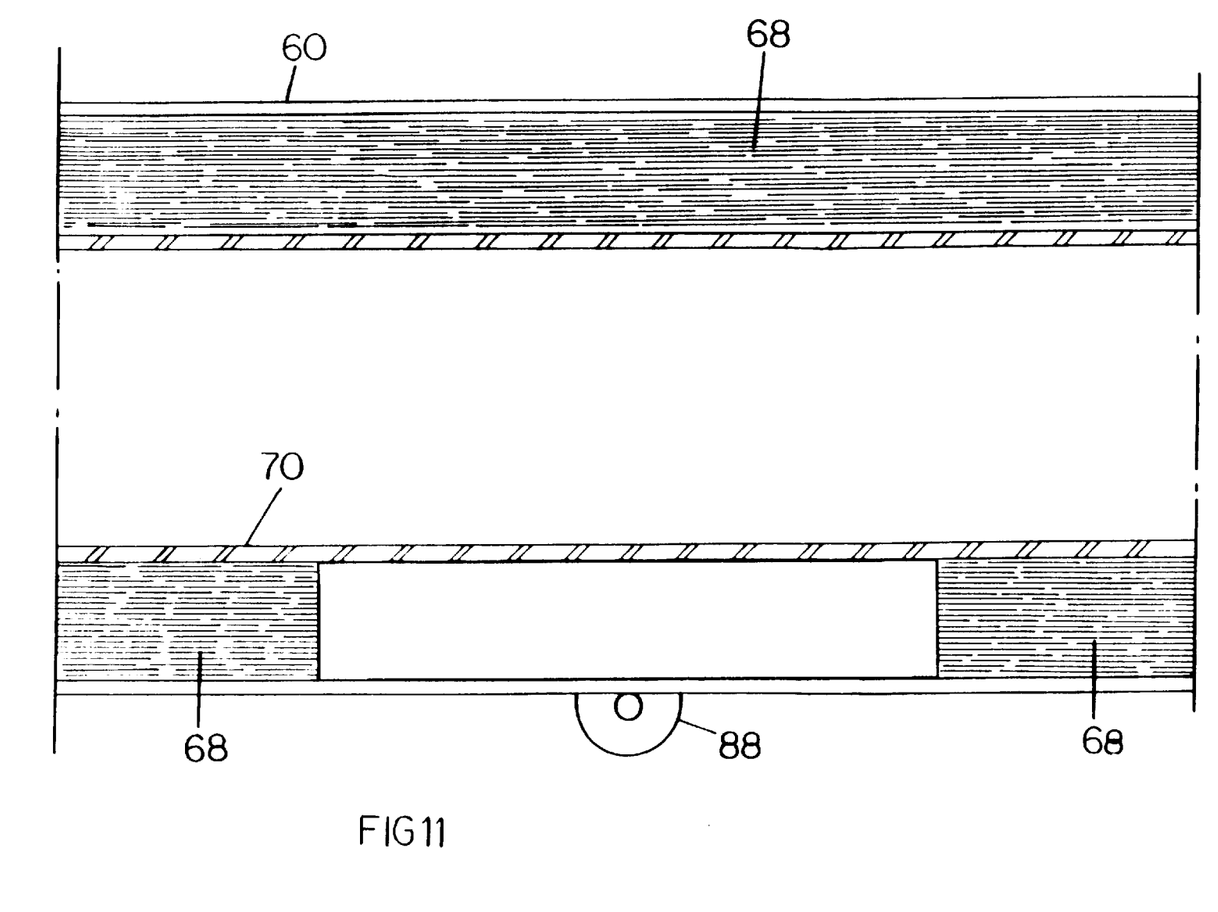
FIG. 11 is an upper view of the tubular longitudinal clamp involving an industrial piping placed on the roll or fixed support.
Figure 12:
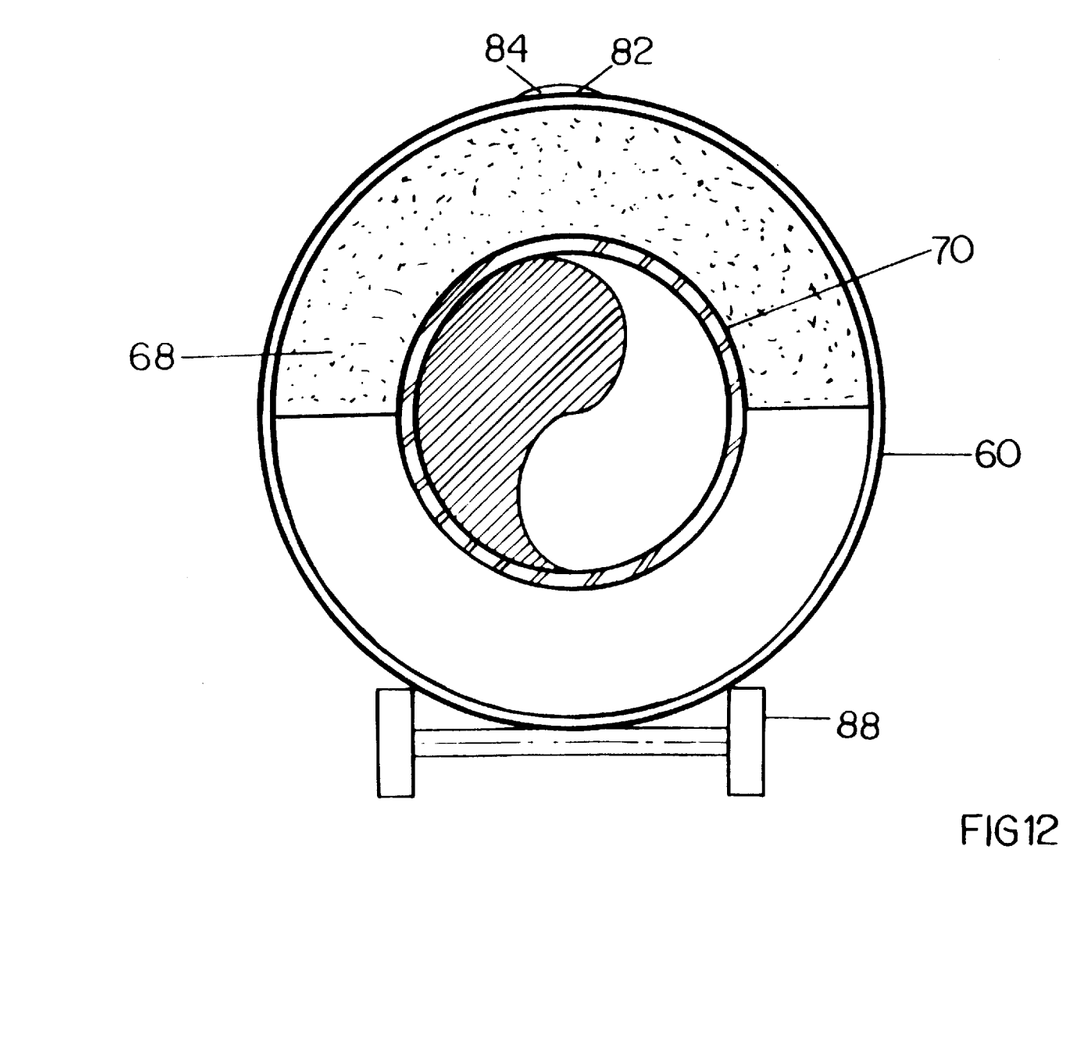
FIG. 12 is a cross section of the tubular longitudinal clamp showed from the FIG. 11.
Figure 13:
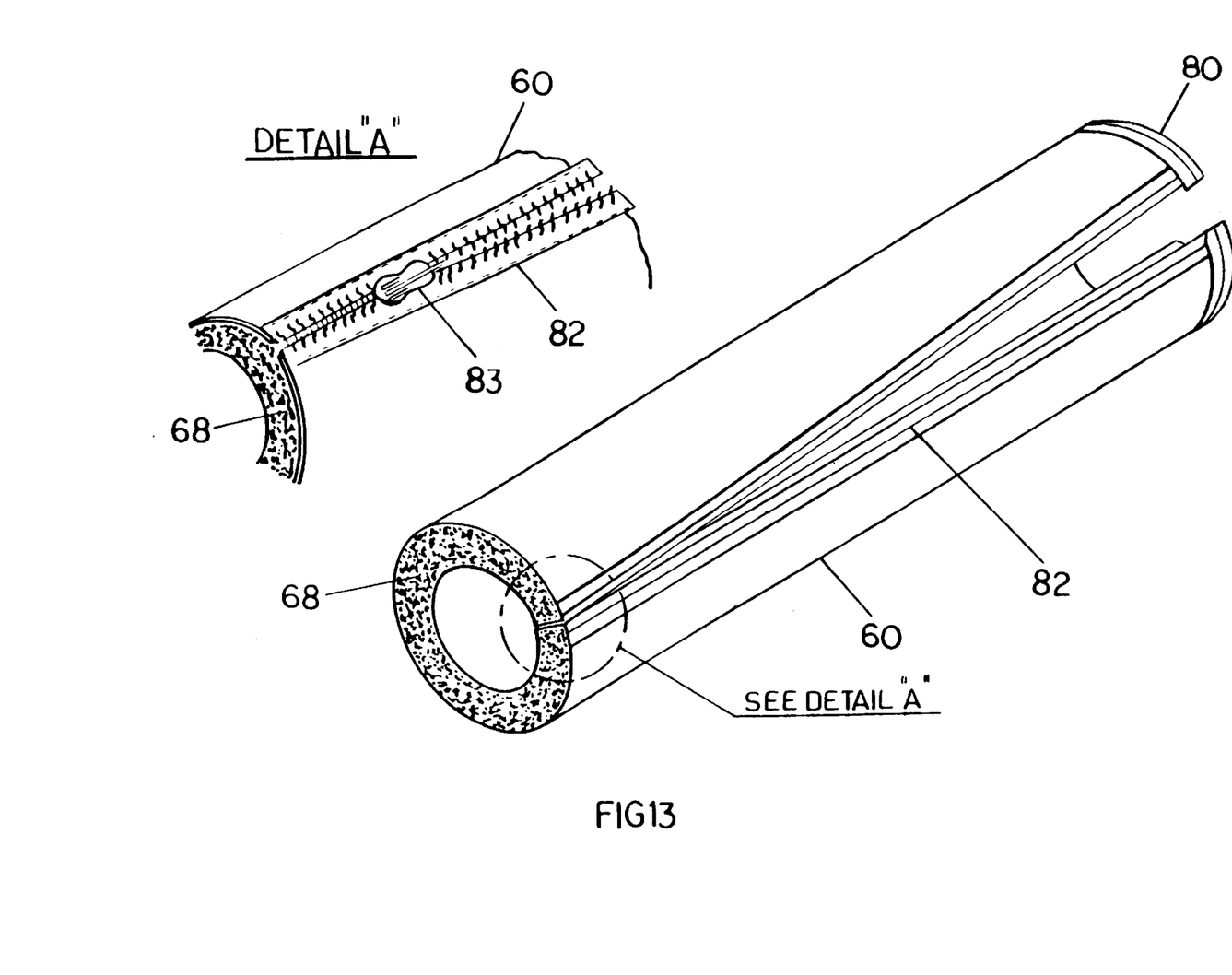
FIG. 13 shows a tubular longitudinal clamp with zipper.

Further, the FIGS. 11 and 12 and 13 shows in an exemplificative way, the thermal insulating system placed over the roll or fixed support 88.

I claim:

1. Thermal insulation system for high and low temperature piping comprising piping on which is installed thermal insulation blankets wherein said insulation blankets are fixed to the piping by at least one tubular longitudinal clamp, said clamp comprising a unitary open tubular body having one slot extending across the entire open tubular body and a first end and a second end, said second end having a diameter larger than said first end, said clamp being adapted to fit over said insulation on said piping and to fix said insulation to said piping, and wherein the at least one tubular longitudinal clamp is connected to another tubular longitudinal clamp by the insertion of the smaller diameter end of one tubular longitudinal clamp into the larger diameter end of an adjacent tubular longitudinal clamp, wherein said clamp is produced from polyvinyl chloride.

2. A thermal insulation system according to claim 1, wherein said clamp is connected with a curved section.

3. Thermal insulation system according to claim 1, wherein the insulation is applied to the piping by helicoidal application.

4. Thermal insulation system according to claim 1, wherein the insulation is in several lengths with a width identical to a perimeter of the piping.

5. Thermal insulation system according to claim 1, wherein said insulation blankets are comprised of ceramic fibers manufactured from electrofusion of silica and alumina magnesium calcium silicate.

6. Thermal insulation system according to claim 1, wherein insulation installed on an element of the piping of greater volume than the piping is fixed to the element by a clamp of greater diameter than the clamp on the piping with reductions on each end thereof.

7. Thermal insulation system according to claim 1, wherein said tubular longitudinal clamp further comprises a transverse and a longitudinal zipper on transverse and longitudinal portions of said clamp in order to provide closure of said clamp around said system.

8. Thermal insulation system according to claim 7, wherein the zipper is an applied self-adhesive tape.

9. Thermal insulation system according to claim 1, wherein a 90° knee is provided in intersection segment of said tubular longitudinal clamp which is provided by thermofusion in an inclined position.

10. Thermal insulation system according to claim 1, wherein a 90°knee is provided in intersection segment of said tubular longitudinal clamp which is provided by gluing welds in an inclined position.

11. Thermal insulation system according to claim 1, wherein a 45°knee is provided in intersection segment of said tubular longitudinal clamp which is provided by thermofusion in an inclined position.

12. Thermal insulation system according to claim 1, wherein a 45°knee is provided in intersection segment of said tubular longitudinal clamp which is provided by gluing welds in an inclined position.

13. A thermal insulation system according to claim 1, wherein said clamp is connected with a T section.

14. A thermal insulation system according to claim 1, wherein said clamp is connected with a reduction section.

* * * * *